Patented Feb. 3, 1948

2,435,380

UNITED STATES PATENT OFFICE 2,435,380

PROCESS FOR PREPARING CATALYSTS

Raymond C. Archibald, Berkeley, and Robert A. Trimble, El Cerrito, Calif., assignors to Shell Development Company, San Francisco, Calif., a corporation of Delaware No Drawing. Application September 4, 1944, Serial No. 552,714

22 Claims. (Cl. 252—228.4)

This invention relates to an improved method of preparing metal sulfide type catalysts which are especially suitable for carrying out dehydrogenations, and to the improved catalysts obtained by such process, and pertains more particularly to improved mixed metal sulfide type catalysts.

Metal sulfides and especially tungsten sulfide has long been recognized as a valuable catalytic agent for effecting hydrogenation and dehydrogenation reactions and its use, alone or in combination with various metals or other metal sulfides, has been variously reported. Numerous attempts have been made to improve the effectiveness of tungsten sulfide, and various combination catalysts consisting largely of tungsten sulfide as well as many specialized methods of preparation have been proposed. Combinations of tungsten sulfide with a sulfide of a metal of the iron group, for example, iron, cobalt, or nickel sulfide, are especially desirable. In such combination catalysts, the tungsten sulfide usually predominates, but in some instances, it is often the practice to use a greater proportion of the sulfides of iron, cobalt or nickel. Many ways of preparing these combination catalysts have been heretofore proposed. However, prior methods have been unsatisfactory for various reasons, such as high losses of tungsten, low catalyst activity, pelleting difficulties, low mechanical stability, high cost, low catalyst life, etc.

It is therefore an object of this invention to provide an improved process of preparing combination catalysts comprising mixtures of the sulfides of a metal of the left sub-group of group VI of the periodic table, especially of tungsten, and of a metal of the iron group, i. e., Fe, Co, Ni.

Another object of the present invention is to provide a method of preparing such combination catalysts, whereby losses of the expensive metal compounds are reduced to a minimum.

It is a further object of this invention to provide improved combination catalysts of the metal sulfide type which are mechanically more stable and are amenable to periodic regeneration to remove carbonaceous deposits by combustion with an oxygen-containing gas.

It is still another object to provide an improved process for the catalytic conversion, especially dehydrogenation, of organic compounds in the presence of such combination metal sulfide catalysts.

Other objects and advantages of the present invention will be readily apparent from the following description.

Briefly, the present invention comprises the main steps of treating an aqueous alkaline solution of a salt of a thioacid of an element of group VI, left sub-group, with an aqueous solution of a salt of an iron group metal and acidifying to a relatively low pH, said thioacid salt solution containing an amount of sulfide ions at least equivalent to said iron-group metal, whereby the mixed sulfides of said group VI element and of said metal are precipitated. Thereafter, the insoluble mixed sulfides are recovered and subjected to reducing conditions and then converted into a form suitable as catalyst.

Although the thioacid salt solution may be treated with a combined solution of an iron-group metal salt and an acid, a superior catalyst is obtained by a stepwise addition of first the metal salt solution and then the acid.

Sufficient acid is added to yield a relatively low pH at which the highest simultaneous insolubilities of the sulfides of both the group VI element and the iron-group metal are obtained. That is, the pH is adjusted to a proper balance between the optimum pH for greatest insolubility of each of said sulfides. In general, this pH is above about 1, since at higher acidities the iron-group metal sulfide becomes quite soluble. The optimum upper limit of pH depends on the nature of the group VI element employed but is in general less than 3. For example, the optimum range for mixtures of sulfides of tungsten and an iron-group metal is from 1 to 2. During the acidification there is a considerable evolution of hydrogen sulfide, and since this evolution substantially stops when the pH is at the desired value, this serves as a practical gauge for determining the point at which the addition of acid should be stopped.

Likewise, the temperature, at which the thioacid salt solution is treated, is preferably closely controlled to give a maximum amount of precipitation of the insoluble sulfides. In general, the treating or precipitation temperature is maintained below about 50° C. and above about 20° C.

For optimum catalyst activity and minimum loss of materials, it is preferable to prepare the thioacid salt solution by conversion of the salt, especially the ammonium salt, of the acid of said group VI element in alkaline solution with a sulfiding agent, such as hydrogen sulfide, ammonium sulfide, sodium sulfide, etc. The sulfiding agent is usually added in excess at this stage to provide an amount of sulfide ions at least equivalent to the iron-group metal subsequently added. It is especially desirable to carry out this conversion to the thio acid salt under closely controlled temperature conditions. Thus, the temperature should usually be maintained above about 35° C. but in general below about 55° C.

Of the elements of the left-hand sub-group of group VI of the periodic table which may be used, those elements having an atomic weight at least as great as molybdenum are more desirable. Further, the process of the present invention is particularly applicable to tungsten, and the preferred salt of thiotungstic acid is the ammonium salt.

For purposes of illustration, the process will be described in more detail in relation to the preparation of mixed sulfides of tungsten and iron-group metals, especially nickel.

Tungsten is usually obtained commercially as tungstic acid or as tungstic oxide which may be in the form of soluble tungstic acid or a less soluble form. The tungstic acid or oxide is dissolved in aqueous ammonia to form a solution of ammonium tungstate. A suitable procedure, especially when using the less soluble form of tungstic acid, for preparing this solution is to suspend the tungstic acid in plain water with stirring and then add the aqueous ammonia. However, when the soluble tungstic acid is used, the order of adding the ingredients is immaterial. It has been found preferable to use aqueous ammonia of, for example, 10–35%, and especially, 28% strength, in this preparation, since, when gaseous ammonia is substituted therefore, the sulfide precipitate finally obtained is more granular and a large portion of the tungsten stays in the filtrate (either in solution or as a colloid). Only a portion of this tungsten in the filtrate will separate on prolonged standing. Tests show definitely that this difference in action between aqueous and gaseous ammonia is not due to differences in the rates of addition of ammonia. The behavior is perfectly normal if the gaseous ammonia is first dissolved in water, and then the tungstic acid added. The phenomenon, therefore, cannot be explained by the presence or absence of certain impurities.

The ammonium tungstate is then converted to the thio acid salt, ammonium thiotungstate, by reaction with a sulfiding agent. When using the preferred hydrogen sulfide as the sulfiding agent, it may simply be bubbled into the ammonium tungstate solution in an open container, although a closed pressure-type vessel provided with stirring means is usually more desirable. In order to form ammonium thiotungstate rather than ammonium dithiotungstate, the temperature should be maintained somewhat above about 35° C., preferably at about 40–50° C. In general, the temperature should be maintained below 55° C. to prevent crystallization of the ammonium thiotungstate. An excess of sulfide ion, preferably as ammonium sulfide, is required to be present in the solution.

To this basic solution of ammonium thiotungstate is added a sufficient amount of a soluble salt of a metal of the iron group to obtain a molal ratio of tungsten to the iron group metal of about 1 to 2 up to 2 to 1, although ratios outside of this range may sometimes be used. Nickel, especially in the form of nickel nitrate, has been found to be most suitable and may be added as a more or less concentrated solution prepared, for example, by dissolving nickel nitrate hexahydrate crystals in a minimum amount of water. The excess sulfide in the ammonium thiotungstate solution causes the precipitation of nickel sulfide (and possibly small amounts of nickel thiotungstate). Although nickel salts other than the nitrate may be used, it has been found that catalyst made with nickel chloride and nickel sulfate have lower catalyst activities than that prepared from nickel nitrate. For example, a catalyst prepared from nickel sulfate had an activity of 4–5% less than one prepared from nickel nitrate. Further, the use of nickel chloride entails difficulties with corrosion of mixing vessels with attending contamination of the product with iron, etc. Although a molal nickel to tungsten ratio of 2 to 0.5 is generally most desirable, a ratio of 1.5 to 2 mols of nickel to 1 mol of tungsten has been found to yield particularly effective catalysts for the selective catalytic dehydrogenation of cyclohexane-type naphthenes.

Preferably thereafter, the tungsten in the slurry of ammonium thiotungstate and nickel sulfide is precipitated as tungsten trisulfide by the addition of a suitable acid, such as preferably sulfuric acid of, for example, 36% by weight strength. Sufficient acid is added to bring the pH of the slurry liquid to between about 1 and 2, especially between 1 and 1.5. There is a copious evolution of hydrogen sulfide during acidification, which practically ceases when sufficient acid has been added to give the desired pH. By carrying out the precipitation of tungsten in this specified pH range, minimum losses of both tungsten and nickel are obtained.

Likewise, in order to obtain minimum losses of the expensive metal compounds, the precipitation by acidification is carried out preferably at a temperature of 20 to 50° C. and especially between 35 and 45° C. For example, with a precipitation temperature of above 45° C. a blue filtrate containing a considerable amount of tungsten was obtained, whereas a yellow-green filtrate of low tungsten content was obtained with a precipitation temperature of below 45° C.

Although it is generally more preferable to add stepwise first the soluble nickel salt solution and then the acid, it may be desirable, in some instances, to combine the acid with the nickel salt solution before addition to the ammonium thiotungstate solution. For example, small streams of ammonium thiotungstate solution and acid solution of nickel nitrate may be mixed at the proper relative rates. In addition to the fact that a catalyst so produced has a slightly lower activity than that prepared by the preferred stepwise precipitation, the nickel sulfide is precipitated less readily at the higher acid concentration so that there is an incomplete precipitation of nickel sulfide from the acidified nickel solution, whereby higher losses of nickel to the filtrate result.

The aqueous slurry is preferably allowed to age for at least about half an hour to obtain more complete precipitation of tungsten trisulfide. This ageing may be accompanied with stirring.

Thereafter, the precipitated sulfide mixture is separated from the acidic aqueous solution. This is accomplished by filtering, such as in vacuum filters, centrifuges, etc. Secondary filters, centrifuges, etc., or settling tanks may be used to recover additional sulfides from the primary filtrates, if desired.

Preferably without washing, or after washing with dilute acid so that the pH of the slurry is not altered, the mixed sulfide precipitate, obtained as a relatively dry filter cake or stiff mud, is then dried and roasted under conditions to reduce the tungsten trisulfide to tungsten disulfide. The actual valence states of the metals of the catalyst in its most active form are not known, but it is believed that the tungsten is present as the disulfide, and the nickel as some sulfide, subsulfide or mixture of elementary nickel and sulfides. It is also possible that a portion of the metals exist in the form of nickel thiotungstate. The sulfur content of the finished catalyst will normally vary between about 23% and 35% by weight of the finished catalyst and will depend in part upon the tungsten to nickel ratio. For the preferred catalysts having a molal nickel to tungsten ratio of 1.5–2.0, the final catalyst may be generally represented by the approximate formula:

$$W \cdot 1.5\text{–}2.0Ni \cdot 3\text{–}4S$$

For example, with a molal nickel to tungsten ratio of 1.5 the whole catalyst can be represented approximately by the formula:

$$W \cdot 1.5Ni \cdot 3S$$

although small proportions of oxygen and other impurities may also be present. A sulfur content of 26 to 28% by weight is particularly desirable for a catalyst with a nickel to tungsten molal ratio of 1.5, although this may change as the catalyst is used.

The heat treatment may be carried out in two stages, i. e., drying and then reducing, whereby less treating gas is required and less catalyst is lost as fine dust. The wet filter cake may be dried by heating at about 100° C. or higher until the evolution of steam starts to decrease. Thereafter the treating-gas flow is started and the temperature increased. The reduction may be carried out, for example, in a rotating drum, at a temperature of about 250° C.–500° C. in the presence of a stream of hydrogen or hydrogen sulfide, or a mixture of hydrogen and hydrogen sulfide, or other reducing gas, such as natural gas. The heat treatment is continued for a long enough period to reduce the tungsten trisulfide to the disulfide and to produce preferably a catalyst which may be readily compressed into pellets for use. The treating time is determined by the pillability of the catalyst, the rate of flow of the reducing gas, etc. and may, for example, be less than 15 minutes for a 200 gram laboratory batch at a hydrogen flow rate of 0.003 cubic foot per minute, and 6 to 8 hours for a 40-pound batch at a hydrogen flow rate of 0.3 cubic foot per minute. As the roasting is continued, the catalyst passes through three stages relative to its pillability. Under-treated catalyst is difficult to pill because it sticks to the pill machine die with the result that the surface of the pill becomes dull and scored, and extreme pressures are required to eject the pill from the die. Further roasting treatment results in pills that are very hard and shiny and require no lubricant or binder. After still further treatment the pills are still hard and shiny, but very brittle so that they split on ejection from the die. A correctly treated catalyst can be pilled with ease. It is believed that pillability is a function of the sulfur content, which decreases during roasting.

When the desired pillability has been attained in a batch of catalyst under treatment, the catalyst is cooled in an inert atmosphere, such as nitrogen, removed from the drier in the form of granules and powder, crushed or granulated to the proper mesh for feeding to the pill machine, and compressed into tablets. If desired, the catalyst may be pilled with a binder and/or a relatively inert extender and/or a small proportion, for example 0.25% to 0.5% of one of the conventional lubricants.

The catalysts described above are especially active and selective for the dehydrogenation of hydroaromatic naphthenes. Furthermore, they have exceptionally long lives and when used to treat such hydrocarbons under suitable conditions may be continuously employed over long periods of time, for instance, 5000 hours or more, before the conversion drops to a level making regeneration advisable. Thus, the frequent regeneration of the catalyst is entirely unnecessary. When, after a long period of use it becomes advisable to regenerate the catalyst, this may be done simply, without resort to the customary burning with oxygen-containing gases (although this method can, if desired, be employed effectively) by passing a stream of sulfur dioxide (preferably diluted with an inert gas) through the catalyst bed for a short time. This regeneration, which may be conveniently executed in situ at temperatures of, for example, 400° C. to 600° C., may be repeated at intervals to maintain the excellent catalytic activity over exceedingly long periods of time. Another suitable regeneration procedure comprising purging with steam, treating with steam and air, and then resulfiding, has also proved exceedingly satisfactory.

As illustrative of the process of the present invention, the following example is given:

Into a kettle containing 46.5 gallons of water was added, with stirring, 64.5 pounds of soluble tungstic acid to form a suspension. To this was added 186 pounds (about 24.5 gallons) of 28% aqueous ammonia, whereby the tungstic acid was completely dissolved except for a slight opalescence. The kettle was closed tightly and warmed to about 40° C. Then the tungsten was converted to ammonium thiotungstate and an excess of ammonium sulfide provided by the addition of hydrogen sulfide until 67 pounds had been dissolved. Cooling was necessary during the addition of hydrogen sulfide to keep down the pressure.

In another vessel 155 pounds of nickel nitrate hexahydrate was dissolved in a minimum volume of water (about 9¼ gallons). This solution of nickel nitrate was slowly added to the solution of ammonium thiotungstate in the closed kettle, whereupon a black precipitate, largely nickel sulfide, was formed with slight evolution of hydrogen sulfide.

The tungsten was then precipitated as tungsten trisulfide by the addition of sulfuric acid of 36% by weight strength until the pH of the slurry was about 1.2. Large volumes of hydrogen sulfide were evolved during the acidification.

Stirring in the closed kettle was continued during all of the above operations and for about ½ hour after acidification while maintaining the temperature between 40° C. and 45° C. The slurry was then withdrawn from the kettle and the precipitate separated from the mother liquor with an imperforate basket-type centrifuge.

The precipitate cake (containing approximately 50–70% water) was charged to a calcining kiln of a design permitting heating to 425° C. in an atmosphere of hydrogen. A residence time of about 6 hours at 400–425° C. in a stream of hydrogen was required to reduce the sulfides to the desired state.

After cooling to room temperature and flushing with inert gas, the granules were crushed to less than 20 mesh and formed into ¼ inch by ¼ inch pills by compression.

This preparation produced approximately 100 pounds of finished catalyst having a composition represented approximately by W·2Ni·4S.

The invention claimed is:

1. An improved process for preparing a catalyst of mixed sulfides of an element of the left subgroup of group VI of the periodic table and of a metal of the iron-group, comprising the steps of treating an aqueous alkaline solution of a salt of a thioacid of said element with an aqueous solution of a water-soluble salt of said metal and with a water-soluble acid to precipitate the sulfides of said element and of said metal, said thioacid salt solution containing sulfide ions in an amount at least equivalent to said metal and said acid being in sufficient amount to obtain a pH of between 1 and 3 at which the sulfide of said element is substantially insoluble the precipitation being carried out at a temperature below about 50° C., removing the water from the precipitate of mixed sulfides, and subjecting the resulting dried sulfides to reducing conditions.

2. An improved process for preparing a catalyst of mixed sulfides of an element of the left subgroup of group VI of the periodic table and of a metal of the iron-group, comprising the steps of treating an aqueous alkaline solution of a salt of a thioacid of said element with an aqueous solution of a water-soluble salt of said metal and with a water-soluble acid to precipitate the sulfides of said element and of said metal, said thioacid salt solution containing sulfide ions in an amount at least equivalent to said metal and said acid being in sufficient amount to obtain a pH of between 1 and 2 the precipitation being carried out at a temperature below about 50° C.

3. An improved process for preparing a catalyst of mixed sulfides of an element of the left subgroup of group VI of the periodic table and of a metal of the iron-group, comprising the steps of treating an aqueous alkaline solution of a salt of a thioacid of said element with an aqueous solution of a water-soluble salt of said metal and with dilute mineral acid to precipitate the sulfides of said element and of said metal, said thioacid salt solution containing sulfide ions in an amount at least equivalent to said metal and said acid being in sufficient amount to obtain a pH of between 1 and 3, the precipitation being carried out at a temperature below about 50° C.

4. An improved process for preparing a catalyst of mixed sulfides of an element of the left subgroup of group VI of the periodic table and of a metal of the iron-group, comprising the steps of treating an aqueous alkaline solution of a salt of a thioacid of said element with an aqueous solution of a water soluble salt of said metal and with a water-soluble acid to precipitate the sulfides of said element and of said metal, said thioacid salt solution containing sulfide ions in an amount at least equivalent to said metal and said acid being in sufficient amount to obtain a pH of between 1 and 2, the precipitation being carried out at a temperature below about 50° C.

5. An improved process for preparing a catalyst of mixed sulfides of an element of the left subgroup of group VI of the periodic table, said element having an atomic weight at least as great as molybdenum, and of a metal of the iron-group comprising the steps of treating an aqueous alkaline solution of a salt of a thioacid of said element with an aqueous solution of a water-soluble salt of said metal and with a water-soluble acid to precipitate the sulfides of said element and of said metal, said thioacid salt solution containing sulfide ions in an amount at least equivalent to said metal and said acid being in sufficient amount to obtain a pH of between 1 and 3, the precipitation being carried out at a temperature below about 50° C., removing the water from the precipitate of mixed sulfides, and subjecting the resulting dried sulfides to reducing conditions.

6. An improved process for preparing a catalyst of mixed sulfides of an element of the left subgroup of group VI of the periodic table and of a metal of the iron-group comprising the steps of converting the acid salt of said element in an aqueous alkaline solution to a salt of the thioacid with an excess of a sulfiding agent at a temperature of about 35° to 50° C., treating said thioacid salt solution with an aqueous solution of a water-soluble salt of said metal and with a water-soluble acid to precipitate the sulfides of said element and of said metal, said acid being in sufficient amount to obtain a pH of between 1 and 3, the precipitation being carried out at a temperature below about 50° C. removing the water from the mixed sulfide precipitate, and subjecting the resulting dried sulfides to reducing conditions.

7. An improved process for preparing a catalyst of mixed sulfides of an element of the left subgroup of group VI of the periodic system and of a metal of the iron-group, comprising the steps of treating an aqueous alkaline solution of a salt of the thioacid of said element first with an aqueous solution of a water-soluble salt of said metal, said thioacid salt solution containing sulfide ions in an amount at least equivalent to said metal, whereby a precipitate of the sulfide of said metal is formed, then adding a water-soluble acid to the resultant slurry until the evolution of hydrogen sulfide caused by the acidification has substantially ceased whereby a sulfide of said element is precipitated, the amount of said acid being sufficient to maintain a pH of between 1 and 3 and the precipitation being carried out at a temperature below about 50° C. removing the water from the precipitate of mixed sulfides and subjecting the resulting dried sulfides to reducing conditions.

8. An improved process for preparing a catalyst of mixed sulfides of an element of the left subgroup of group VI of the periodic system and of a metal of the iron-group, comprising the steps of treating an aqueous alkaline solution of a salt of the thioacid of said element with an aqueous solution of a water-soluble salt of said metal and with a water-soluble acid to precipitate the sulfides of said element and of said metal, said thioacid salt solution containing sulfide ions in an amount at least equivalent to said metal and said acid being in sufficient amount to obtain a pH of between 1 and 3 the precipitation being carried out at a temperature of 20° to 50° C., separating the precipitate of mixed sulfides from the major portion of the water in the slurry, drying the separated precipitate, and heating the dried precipitate at a temperature of 250–500° C. in a reducing atmosphere.

9. An improved process for preparing a combination catalyst of mixed sulfides of tungsten and of a metal of the iron group comprising the steps of treating an aqueous alkaline solution of a salt of thiotungstic acid with an aqueous solution of a water-soluble salt of said metal and with sulfuric acid to precipitate an insoluble sulfide of tungsten and the sulfide of said metal, said thiotungstic acid salt solution containing sulfide ions in an amount at least equivalent to said metal and said acid being in sufficient amount to obtain a pH of between 1 and 2, the precipitation being carried out at a temperature between about 35° C. and 45° C. removing the water from the precipitate of mixed sulfides and subjecting the resulting dried sulfides to reducing conditions.

10. An improved process for preparing a combination catalyst of mixed sulfides of tungsten and of a metal of the iron-group comprising the steps of treating an aqueous alkaline solution of a salt of thiotungstic acid with an aqueous solution of a water-soluble salt of said metal and with an acid to precipitate tungsten trisulfide and the sulfide of said metal, said thiotungstic acid salt solution containing sulfide ions in an amount at least equivalent to said metal and said acid being in sufficient amount to obtain a pH of between 1 and 2, and the precipitation being carried out at a temperature below about 45° C., removing the water from the precipitate of mixed sulfides, and subjecting the resulting dried sulfides to reducing conditions 11. An improved process for preparing a combination catalyst of mixed sulfides of tungsten and a metal of the iron-group comprising the steps of introducing aqueous ammonia into an aqueous suspension of tungstic acid to form an alkaline solution of ammonium tungstate, converting said tungstate to ammonium thiotungstate with an excess of hydrogen sulfide at a temperature above about 35° C., treating said solution of ammonium thiotungstate with an aqueous solution of a water-soluble salt of said metal and with an acid to precipitate tungsten trisulfide and the sulfide of said metal, said thiotungstate solution containing sulfide ions in an amount at least equivalent to said metal and said acid being in sufficient amount to obtain a pH of between 1 and 2, the precipitation being carried out at a temperature below about 50° C. removing the water from the precipitate of mixed sulfides and subjecting the resulting dried sulfides to reducing conditions.

12. An improved process for preparing a combination catalyst of mixed sulfides of tungsten and a metal of the iron-group comprising the steps of introducing aqueous ammonia into an aqueous suspension of tungstic acid to form an alkaline solution of ammonium tungstate, converting said tungstate to ammonium thiotungstate with an excess of hydrogen sulfide at a temperature above about 35° C., treating said solution of ammonium thiotungstate with an aqueous solution of a water-soluble salt of said metal and with a water-soluble acid to precipitate tungsten trisulfide and the sulfide of said metal, said thiotungstate solution containing sulfide ions in an amount at least equivalent to said metal and said acid being in sufficient amount to obtain a pH of between 1 and 2, the precipitation being carried out at a temperature between 20° and 50° C. separating the precipitate of mixed sulfides from the major portion of the water in the slurry, drying the separated precipitate, and heating the dried precipitate at a temperature of 250–500° C. in a stream of reducing gas.

13. An improved process for preparing a combination catalyst of mixed sulfides of tungsten and a metal of the iron-group comprising the steps of introducing aqueous ammonia into an aqueous suspension of tungstic acid to form an alkaline solution of ammonium tungstate, converting said tungstate to ammonium thiotungstate with an excess of hydrogen sulfide at a temperature above about 35° C., treating said solution of ammonium thiotungstate with an aqueous solution of a water-soluble salt of said metal and with a dilute mineral acid to precipitate tungsten trisulfide and the sulfide of said metal, said thiotungstate solution containing sulfide ions in an amount at least equivalent to said metal and said acid being in sufficient amount to obtain a pH of between 1 and 2, the precipitation being carried out at a temperature below about 50° C. separating the precipitate of mixed sulfides from the major portion of the water in the slurry, drying the separated precipitate, and heating the dried precipitate at a temperature of 250–500° C. in a stream of reducing gas comprising hydrogen to reduce the sulfur content.

14. The process of claim 13, wherein said reducing gas comprises a mixture of hydrogen and hydrogen sulfide.

15. An improved process for preparing a combination catalyst of mixed sulfides of tungsten and nickel, comprising the steps of treating an aqueous alkaline solution of a salt of thiotungstic acid with an aqueous solution of a water-soluble nickel salt and with an acid to precipitate tungsten trisulfide and nickel sulfide, said thiotungstic acid salt solution containing sulfide ions in an amount at least equivalent to said nickel and said acid being in sufficient amount to obtain a pH of between 1 and 2, the precipitation being carried out at a temperature below about 50° C. removing the water from said mixed sulfide precipitate, and subjecting said dried sulfides to reducing conditions.

16. The process of claim 15, wherein said water-soluble nickel salt is nickel nitrate.

17. The process of claim 15, wherein said solution of nickel salt is first added to the thiotungstic acid salt solution and then the acid is added to the resultant nickel sulfide-containing liquid.

18. The process of claim 15, wherein said acid is dilute mineral acid.

19. The process of claim 15, wherein said acid is sulfuric acid.

20. An improved process for preparing a combination catalyst of mixed sulfides of tungsten and nickel, comprising the steps of treating an aqueous alkaline solution of a salt of thiotungstic acid with an aqueous solution of a water-soluble nickel salt and with an acid to precipitate tungsten trisulfide and nickel sulfide, said thiotungstic acid salt solution containing sulfide ions in an amount at least equivalent to said nickel and said acid being in sufficient amount to obtain a pH of between 1 and 2, the precipitation being carried out below a temperature of about 50° C., removing the water from the precipitate of tungsten trisulfide and nickel sulfide, and subjecting the resulting dried precipitate to reducing conditions to reduce the tungstein trisulfide to tungsten disulfide and the nickel sulfide to a nickel sub-sulfide.

21. The process of claim 19, wherein the reduction is continued until the product has a composition approximately represented by the formula $$W \cdot 1.5 - 2Ni \cdot 3 - 4S$$

22. A catalyst, especially suitable for dehydrogenating conversions of hydrocarbons of the type of cyclohexane-type naphthenes, consisting essentially of a reduced mixed sulfide prepared by the process comprising the steps of treating an aqueous alkaline solution of a salt of thiotungstic acid with an aqueous solution of a water-soluble salt of nickel and with an acid and thereby forming a precipitate containing an insoluble sulfide of tungsten and a sulfide of nickel, said thiotungstic acid salt solution containing sulfide ions in an amount at least equivalent to said nickel and said acid being in sufficient amount to obtain at pH of between 1 and 2, the precipitation being effected at a temperature below about 50° C. approximately represented by the formula $$W \cdot 1.5 - 2Ni \cdot 3 - 4S$$

RAYMOND C. ARCHIBALD.
ROBERT A. TRIMBLE.

REFERENCES CITED

The following references are of record in the file of this patent:

UNITED STATES PATENTS

| Number | Name | Date |
|---|---|---|
| 1,862,949 | Al | June 14, 1932 |
| 2,026,819 | Boswell | Jan. 7, 1936 |
| 2,037,781 | Grosse | Apr. 21, 1936 |
| 2,075,172 | Buell et al. | Mar. 30, 1937 |
| 2,094,128 | Lazier et al. | Sept. 28, 1937 |
| 2,105,665 | Lazier et al. | Jan. 18, 1938 |
| 2,123,623 | Brown | July 12, 1938 |
| 2,159,511 | Pier et al. | May 23, 1939 |
| 2,192,125 | Brown et al. | Feb. 27, 1940 |
| 2,215,876 | Herold et al. | Sept. 24, 1940 |

OTHER REFERENCES

Analytical Chemistry, Treadwell-Hall, vol. I, 7th ed., Wiley & Sons, 1930, page 184.